United States Patent
Riede

(10) Patent No.: US 6,899,021 B2
(45) Date of Patent: May 31, 2005

(54) SALAD SPIN DRYER

(75) Inventor: Hansjürgen Riede, Lyss (CH)

(73) Assignee: Moha Moderne Haushaltwaren AG, Zollikofen (CH)

( * ) Notice: Subject to any disclaimer, the term of this patent is extended or adjusted under 35 U.S.C. 154(b) by 0 days.

(21) Appl. No.: 10/484,137

(22) PCT Filed: Sep. 2, 2002

(86) PCT No.: PCT/CH02/00479

§ 371 (c)(1),
(2), (4) Date: Jan. 16, 2004

(87) PCT Pub. No.: WO03/043477

PCT Pub. Date: May 30, 2003

(65) Prior Publication Data

US 2004/0168583 A1 Sep. 2, 2004

(30) Foreign Application Priority Data

Nov. 19, 2001 (CH) .............................................. 2117/01

(51) Int. Cl.$^7$ .......................... A47J 43/04; F26B 17/24; F26B 17/30
(52) U.S. Cl. ................................ 99/495; 99/511; 34/58
(58) Field of Search ........................... 99/495, 511–513, 99/516, 536, 479, 485; 34/8, 58, 184, 317; 210/360.1, 380.1, 781, 784; 494/11, 37, 46, 60, 62, 63, 84; 241/282.1, 37, 5, 92; 426/443, 478, 601; 366/234, 601

(56) References Cited

U.S. PATENT DOCUMENTS

| | | | | |
|---|---|---|---|---|
| 3,885,321 A | * | 5/1975 | Fouineteau | 34/58 |
| 5,562,025 A | * | 10/1996 | Bull et al. | 99/495 |
| 5,904,090 A | * | 5/1999 | Lillelund et al. | 99/495 |
| 6,018,883 A | * | 2/2000 | Mulhauser | 34/58 |
| 6,510,785 B1 | * | 1/2003 | Margolin | 99/495 |
| 6,622,618 B1 | * | 9/2003 | Glucksman et al. | 99/495 |

FOREIGN PATENT DOCUMENTS

| | | |
|---|---|---|
| CH | 353509 | 4/1961 |
| EP | 0 919 177 A1 | 6/1999 |
| FR | 1.012.262 | 7/1952 |

* cited by examiner

*Primary Examiner*—Timothy F. Simone
(74) *Attorney, Agent, or Firm*—Pauley Petersen & Erickson

(57) ABSTRACT

A salad shaker having a lower part of a container and a cover which is placed on the cover and has a cable pull drive by which the salad sieve can be rotated. The drive is connected to a rotating plate by a free-running device which acts on both sides, and enables the rotational direction of the salad sieve to be charged in a spring-biased manner. The repeated change in rotational direction causes the shaking efficiency to be significantly improved. The restoring force of the inventive spring automatically reels in the cable and holds the handle in a desired position on the cover in a spring-biased manner. The drive of this invention can also be used in handle-operated salad shakers.

10 Claims, 2 Drawing Sheets

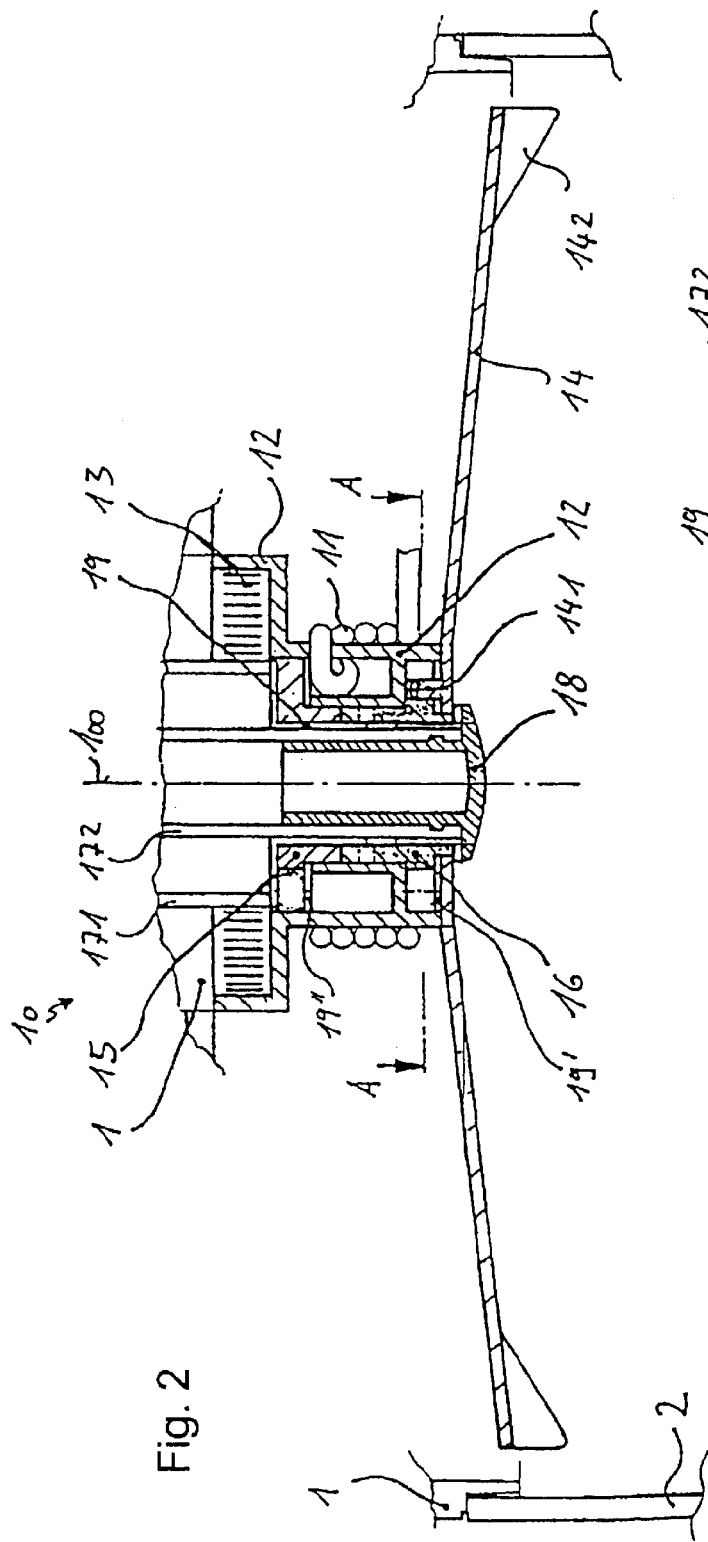
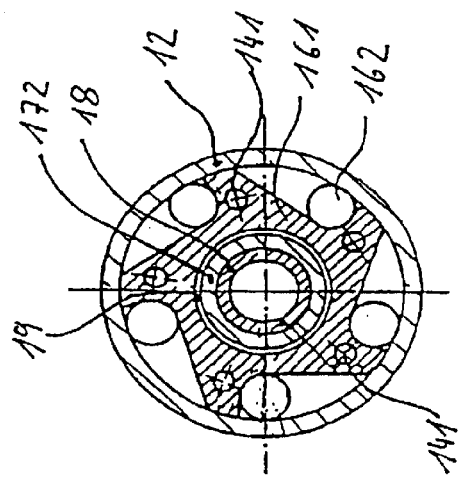
Fig. 2
Fig. 3

SALAD SPIN DRYER

BACKGROUND OF THE INVENTION

1. Field of the Invention

This invention relates to a salad spin dryer with a lower part, a salad sieve rotatable about an axis, and a lid.

2. Discussion of Related Art

Several salad spin dryers are available on the market. They all have a bowl-like container lower part and a lid with an integrated drive unit. In the container lower part there is a salad sieve rotatably mounted about a vertical axis. For emptying and for cleaning the salad sieve can be removed. The salad sieve has an essentially cylindrical sidewall and a flat base and is open to the top. On the lower side of the lid there is a rotating plate which is rotatable about the vertical axis. The rotating plate has tabs which reach downwards and with a closed spin dryer are in active connection with the salad sieve. Usually, the tabs engage between corresponding ribs of the salad sieve which are arranged uniformly distributed over an upper periphery of the sieve. The rotating plate is connected to a gear with gearwheels in a known manner. A crank is located in the lid and the gear may be driven by the crank. If one rotates the crank, then the rotating plate and thus the complete salad sieve is set into rotation. By multiplication in the gear one achieves high rotational speeds and the remaining water which the salad leaves retain from washing is shaken through the openings of the salad sieve to the outside by way of the exerted centrifugal force. It hits the inner wall of the container lower part where it may run downwards and collects on the base. With the spinning procedure with such a crank-operated salad spin dryer the sieve always rotates always in the same direction. The sieve must be completely braked or stopped before a change in the rotational direction, before it may be rotated into the other direction. These known salad spin dryers have one disadvantage in that the crank needs to be rotated in a constant manner until the salad leaves are sufficiently dried. An unbalance produced by the non-uniform distribution of the salad leaves in the salad sieve brakes the rotational movement and in time damages the bearing and gear.

Also known is a salad spin dryer with a yoyo-like pull-cord mechanism which on spinning ensures a regular change in rotational direction. Customers desire this because the rhythmic braking and acceleration in the opposite direction considerably improve the spinning result. With known pull-cord drives, the rotating plate is seated on a vertical axle arranged centrally in the lid, on which also one end of the pull-cord is fastened. At the opposite end of the cord there is fastened a grip which permits a simple gripping and prevents the complete pulling of the cord into the lid. If the cord is wound around the axle then the rotating plate and thus the salad sieve may be set into a quick rotation opposite to the direction of winding by way of a strong pulling. If the axle-side end of the cord is reached then this is automatically wound around the axle in the rotational direction. Shortly before a complete winding-on of the cord the user brakes the rotational movement so that the rotating plate and the sieve come to a complete stop. The cord is now completely or at least approximately completely wound-up and with a renewed pulling the rotating plate and sieve are set into rotation with the reverse rotational direction. After spinning for a sufficiently long time, the lid may be lifted from the lower part of the container and the salad sieve may be lifted out of the lower part of the container. The residual water is removed from the container lower part. One disadvantage of the known pull-cord spin dryers is that at the end of the spinning procedure the cord with the handle is not completely retracted but partly hangs out of the lid. The cord needs to be completely wound up by hand by way of the rotating plate. If the handle due to its intrinsic weight partly rolls off the cord and hangs down on spin dryer in an unsightly manner, then a separate retainer is required.

SUMMARY OF THE INVENTION

It is one object of this invention to provide a salad spin dryer without these disadvantages.

The features of this invention are discussed in this specification and in the claims.

One advantage of this invention is that the rotational direction of the salad sieve is changed again and again automatically. The regular change in rotational direction has an effect that the salad leaves change their position in the salad sieve. With this the residual water which is located in the troughs in the salad leaves closed to the outside is likewise shaken out after the change in rotational direction.

Another advantage of this invention is that the restoring force of the spring-pull according to this invention rolls up the cord automatically and retains the handle impinged by spring force in a desired position on the lid.

BRIEF DESCRIPTION OF THE DRAWINGS

This invention is described in view of the drawings, wherein:

FIG. 2 shows a section view taken along a vertical axis through a spin dryer drive; and FIG. 3 shows a horizontal section view taken along line A—A, as shown in FIG. 2, through the drive.

DESCRIPTION OF PREFERRED EMBODIMENTS

Figure 1:
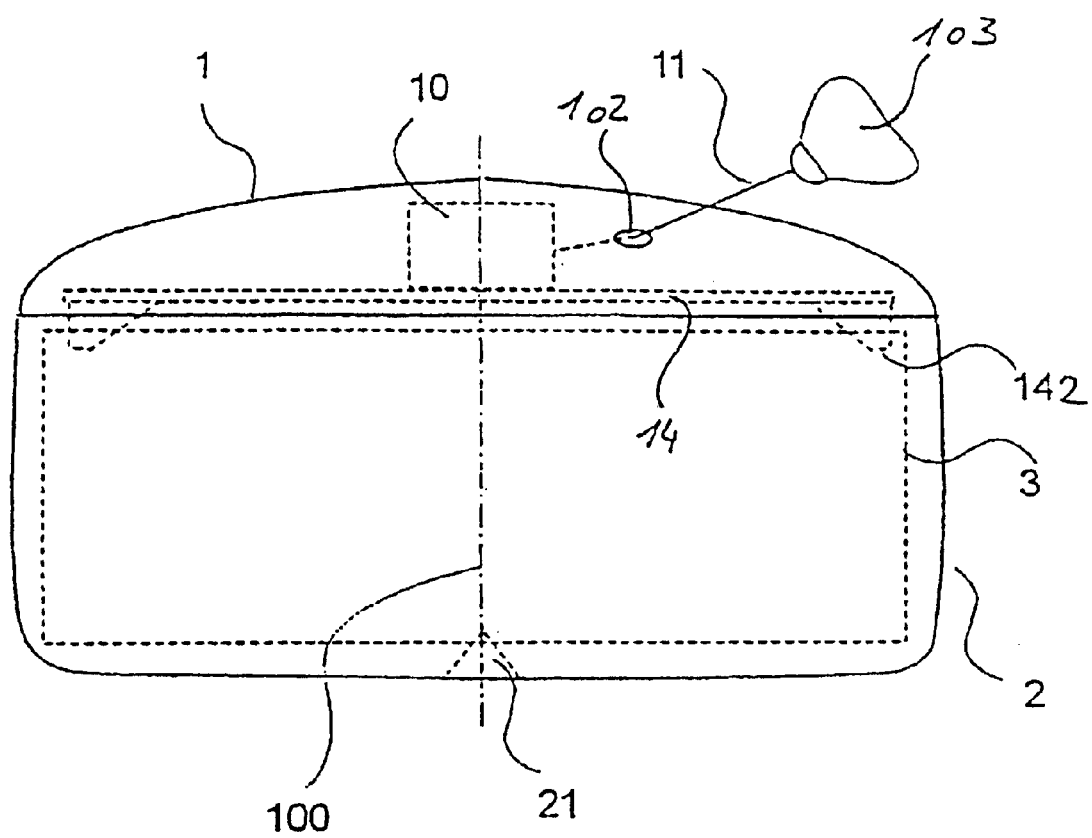
FIG. 1 shows a salad spin dryer according to this invention, in a lateral view.

A salad spin dryer according to this invention is shown in FIG. 1, and comprises a container lower part 2 and a lid 1 placed thereon and in the inside comprises a basket-like salad sieve 3. The lid 1 may be lifted from the container lower part 2. In the center of the base in the container lower part 2 there is a bearing pin 21. The salad sieve 3 is rotatably mounted on the bearing pin 21 about a vertical axis 100. The salad sieve 3 in a known manner may be removed from the container lower part 2. In the lid 1 is the new drive 10 with which the salad sieve 3 may be set into rotation. A pull-cord 11 is led through an opening 102 in the lid 1. The pull-cord cord 11 connects the handle 103 which is arranged outside the lid 1 at the opposite end of the pull-cord to the drive in the inside of the lid 1. The drive 10 is mechanically connected to a rotating plate 14. The rotating plate 14 is preferably releasably connectable to the salad sieve 3 with a positive fit in the known manner. The rotating plate 14 with a closed lid forms an upper covering for the salad sieve 3 and on the edge comprises a number of tabs 142 which engage into corresponding openings or between ribs in the salad sieve 3. The tabs 142 serve as lugs and transmit a rotational movement of the rotating plate 14 onto the salad sieve 3.

The new drive 10 is located completely in or on the lid 1 as shown in FIG. 2. The drive comprises a cord drum 12 around which the pull-cord 11 may be wound or unwound. The cord drum 12 is fastened rotatable about two sleeves 171, 172 arranged concentrically and rigidly. A spiral spring 13 is tensioned between an upper fastening sleeve 171 and the rotatable cord drum 12. With its inner end the spiral spring 13 is fastened on the sleeve 171 and with its other end on the inner side of the cord drum 12. A second sleeve 172 is arranged rigidly on the lid concentrically within the sleeve 17. The bearing sleeve 172 extends further downwards and has a smaller diameter than the fastening sleeve 171. The lower edge of the bearing sleeve 171 in the embodiment according to FIG. 2, with the lower edge of the lid, lies approximately in one plane. The part of the bearing sleeve 172 projecting downwards from the outer fastening sleeve 171 carries a single-part or multi-part bearing bushing 19. The bearing bushings may have ball bearings, roller bearings or rocker bearings, or in a simple version, as shown, may be manufactured of a material for reducing friction. Further bearing elements 19', 19" are arranged at other locations of the drive 10 which have a higher friction loading.

A cover 18 is admitted into the bearing sleeve 172 at the lower end and is preferably held in a clamped manner. With its flattish head the cover 18 covers the center of the rotating plate 14 and retains the rotating plate 14 in the desired axial position at the lower end of the bearing sleeve 172.

The rotating plate 14 with a plurality of upwardly projecting cams 141 which are arranged about a central opening of the rotating plate 14 engages into corresponding openings on the lower side of a lower free-wheel device or means 16. The lower free-wheel device or means 16 in a freely rotatable manner circumscribes the bearing bushing 19 which is seated on the bearing sleeve 172. Together with the lower free-wheel device 16 an upper free-wheel device 15 is arranged in the region between a lower cord-carrying part of the cord drum 12 and the bearing bushing 19.

The cord drum 12 is rotatably mounted on the bearing sleeve 172 via the two free-wheel devices 15, 16. The rotational movement of the cord drum about the bearing sleeve 172 is limited by the spiral spring 13 which as described above engages on an upper part of the cord drum 12 and on the fastening sleeve 171.

The upper 15 and lower free-wheel device 16 are connected to one another with a positive and/or non-positive fit and have an opposite free-wheel or blocking function with respect to the cord drum 13. FIG. 3 shows a section taken through the drive 10 in the region of the lower free-wheel means 16. The free-wheel means 16 is mounted within the cord drum 12 so that a plurality of blocking or clamping rollers or roller devices 162 are able to create a clamped releasable connection between the inner wall of the cord drum 12 and a central blocking body 161. With its central opening the blocking body 161 is seated on the bearing sleeve 172 in a freely rotatable manner, wherein the rotational direction is simplified by the intermediately lying bearing bushing 19. The cams 141 which from the rotating plate 14 engage into the corresponding receivers in the blocking body are shown in section.

With this or another known free-wheel type, on pulling out the pull-cord 11 from the first free-wheel means 16 one exerts a blocking effect while the second free-wheel means 15 is free running. On pulling in the cord, the conditions are exactly reversed.

If the pull-cord 11 is pulled out, then it is wound off the pull-cord drum 12. Thus the cord drum 12 is turned in a first direction. The first lower free-wheel means 16 thus is brought into the blocking position and co-rotated. Via the already described positive-fit cam connection the free-wheel means also sets the rotating plate 14 into rotation in the first rotational direction.

During the pulling-out of the pull-cord 11 the spiral spring 13 is simultaneously tensioned. An abutment prevents the pull-cord 11 from being pulled too far. If the pull-cord reaches a completely pulled-out position, then the cord drum comes to a standstill and releases the first free-wheel means 16. The rotating plate 14, due to the free-wheel effect of both free-wheel means 15, 16, may rotate further until the rotational movement due to friction becomes smaller and finally ends.

If the pulled-out pull-cord 11 is released or relaxed then the pull-cord 11 is automatically pulled in by the force of the tensioned spiral spring 13 and is wound onto the cord drum 12. The cord drum 12 is thus moved by the spiral spring 13 in the direction opposite to the pulling-out direction or to the first rotational direction. This oppositely-directed rotational movement of the cord drum now blocks the second upper free-wheel means 15, while the first lower free-wheel means 16 remains in the free-wheel function. The upper blocked free-wheel means 15 rotates and thus also the lower free-wheel means 16 and the rotating plate 14 now in the direction opposite to the pulling-out direction. The salad sieve 13 is likewise set into rotation in this direction. If the pull-cord 11 is completely pulled in, then the handle 103 is located in the abutment at the opening 102 in the lid 1 and the cord drum 12 comes to a standstill. The second upper free-wheel means 15 now no longer blocks and the free-wheel function of both free-wheel means 15, 16 permits the rotating plate 14 and the salad sieve 3 to rotate further as long as the inertia is sufficient, or the movement in the second direction is stopped by a renewed pull on the handle 103.

The first lower free-wheel means 16 with the renewed pulling-out of the pull-cord 11 again moves into a blocking function and effects a renewed movement of the free-wheel means and the rotating plate 14 connected to it, in the first rotational direction together with the cord drum 12.

With the above described device, on pulling out the cord 11, the salad sieve 3 is set in rotation in a first direction and remains in rotation in this direction as long as its moment of inertia acts. However, as soon as the pulled-out pull-cord 11 is released, the spiral spring 13 by way of the second free-wheel means 15 begins to set the rotating plate 14 and the salad sieve 3 in rotation in the opposite direction. With a sudden release of the pulled-out cord one may force a sudden stop of the movement in the first rotational direction and a reversal of the rotational direction. With this sudden stop the salad leaves within the salad sieve 3 are moved by their own inertia and even partly turned over. With the spinning process in the opposite direction which now follows, trapped drops of water may be still discharged out.

The drive according to this invention may be applied to salad spin dryers with a crank drive. In place of the cable and the spiral spring the crank mechanism steps in to drive the opposing rotational movements. Instead of a cord drum one applies a drive drum which is preferably circumferentially toothed in an outer casing region so that it may be driven in both directions by a crank drive. As soon as the crank is rotated in one direction, the drive drum is accelerated until a desired highest crank speed has been reached. With the blocked first free-wheel means the rotational movement in a first direction is transmitted to the salad sieve 3 in the manner previously described. With a stop of the crank movement the salad sieve 3, analogously to a pull-cord drive, rotates further in the same direction until it comes to a standstill by itself due to the friction, or until the crank is moved in the opposite second direction. In this case, a blocking of the second free-wheel means specifically occurs and thus a jolt-like change in the rotational direction of the salad sieve 3. With a crank-operated salad spin dryer according to this invention, the user may thus freely choose whether he wants to cause a change in rotational direction or not. It may also be driven again and again in only one direction.

As previously mentioned, the spiral spring 13 ensures that the pull-cord in the idle position is always completely wound up, which means that the handle 30 is held indirectly on the lid impinged by spring force, or on the opening 102. This brings two advantages, first the cord is always accommodated in the inside of the lid except for when one pulls on the handle, and second the grip by way of the prevailing spring force may be held in practically any desired position, also opposite to the force of gravity acting on it. If the handle is formed in the shape of a salad head, then the cord may be fastened to the lower side of the salad head, and in the relieved condition the spring force will hold the salad head in the upright condition on the surface of the lid exactly over the opening 102.

The passage opening 102 may also be arranged at the edge of the lid 1, and a handle 103 may be held in the idle position horizontally projecting from the lid 1. The different grip positions may be achieved without additional clamping or retaining means.

What is claimed is:

1. A salad spin dryer comprising: a container lower part (2) and a salad sieve (3) rotatable within the lower part (2) about a vertical axis (100), a lid (1) having a lower side and a rotating plate (14) rotatable about the vertical axis (100) and engaged with the salad sieve (3) by tabs (142), a drive (10) setting the rotating plate (14) into rotation, the drive (10) including a cord drum (12) and a pull-cord (11) which is wound onto and off the cord drum (12) and which has one end fastened on the cord drum (12) and an opposite end fastened to a handle (103), and the cord drum (12) and the rotating plate (14) operationally coupled via a free-wheel device (15, 16) acting on two sides.

2. A salad spin dryer comprising: a container lower part (2) and with a salad sieve (3) rotatable within the lower part (2) about a vertical axis (100), a lid (1) having a lower side and a rotating plate (14) rotatable about the vertical axis (100) and engaged with the salad sieve (3) by tabs (142), a drive (10) setting the rotating plate (14) into rotation, the drive (10) including a drive drum drivable via a crank mechanism which is operationally coupled to the rotating plate (14) via a free running device (15, 16) acting on two sides.

3. A salad spin dryer according to claim 1, wherein between the second cord drum (12) and the lid (1) is a spiral spring (13) arranged concentrically about the vertical axis (100), and on pulling out the pull-cord (11) the spiral spring (13) is tensioned by a rotation of the cord drum (12).

4. A salad spin dryer according to claim 3, wherein between the cord drum (12) and the rotating plate (14) is a first free-wheel device (16) with a first entraining direction and a second free-wheel device (15) with a second entraining direction that is opposite to the first entraining direction.

5. A salad spin dryer according to claim 4, wherein the pull-cord (11), when rolled up, is wound off from the cord drum (12) counter to a force of the spiral spring (13), and the rotating plate (14) is driven in the first entraining direction by the first blocking free-wheel device (16).

6. A salad spin dryer according to claim 4, wherein the pull-cord (11) when pulled out and released is wound up onto the cord drum (12) by the force of the tensioned spiral spring (13), and by the second blocking free-wheel device (15) in the second entraining direction the rotating plate (14) is driven in a reverse direction.

7. A salad spin dryer according to claim 6, wherein the pull-cord (11) has an end abutment for limiting a pull-out length, and has a handle (103) for limiting a pull-in length.

8. A salad spin dryer drive for driving a salad sieve arranged rotatable about a vertical axis (100), wherein the drive (10) comprises a primary drive is one of a pull-cord/spring and a crank drive in active connection with a secondary drive which is one of a cord drum and a drive drum, wherein the primary drive and the secondary drive are rotatably mounted about the vertical axis (100) and rotational movements of the secondary drive is actively transmitted to a rotating plate by a free-wheel device (15, 16) acting on two sides.

9. A salad spin dryer according to claim 5, wherein the pull-cord (11) has an end abutment for limiting a pull-out length, and has a handle (103) for limiting a pull-in length.

10. A salad spin dryer according to claim 4, wherein the pull-cord (11) has an end abutment for limiting a pull-out length, and has a handle (103) for limiting a pull-in length.

* * * * *